United States Patent [19]

Deyrup

[11] Patent Number: 4,486,564

[45] Date of Patent: Dec. 4, 1984

[54] MOLDING COMPOSITIONS

[75] Inventor: Edward J. Deyrup, Northeast, Md.

[73] Assignee: E. I. Du Pont de Nemours and Company, Wilmington, Del.

[21] Appl. No.: 569,927

[22] Filed: Jan. 11, 1984

Related U.S. Application Data

[63] Continuation of Ser. No. 360,569, Mar. 22, 1982, abandoned, which is a continuation-in-part of Ser. No. 009,295, Feb. 5, 1979, abandoned, which is a continuation-in-part of Ser. No. 882,219, Feb. 28, 1978, abandoned.

[51] Int. Cl.$^3$ ................................................ C08K 5/11
[52] U.S. Cl. .................................... 524/308; 524/310; 524/317
[58] Field of Search ............... 524/311, 312, 313, 314, 524/315, 322, 308, 317

[56] References Cited

U.S. PATENT DOCUMENTS

| | | | |
|---|---|---|---|
| 3,435,093 | 3/1969 | Cope | 260/857 |
| 3,516,957 | 6/1970 | Gray | 260/22 |
| 3,639,527 | 2/1972 | Brinkman | 260/873 |

FOREIGN PATENT DOCUMENTS 1117139  6/1968  United Kingdom .

Primary Examiner—Paul R. Michl

[57] ABSTRACT

Polyethylene terephthalate compositions containing filler or reinforcing agent, a selected sodium or potassium salt of a selected organic polymer containing pendant carboxyl groups, and a selected low molecular weight organic ester. Articles molded from the compositions have high gloss when molded at temperatures below 110° C.

10 Claims, No Drawings

MOLDING COMPOSITIONS

CROSS REFERENCE TO RELATED APPLICATIONS

This application is a continuation of application Ser. No. 360,569 filed Nov. 22, 1982 abandoned which is a c.i.p. of application Ser. No. 009,295 filed Feb. 5, 1979 abandoned which is c.i.p. of application Ser. No. 882,219 filed Feb. 28, 1978 abandoned.

FIELD OF THE INVENTION

This invention relates to polyethylene terephthalate resins useful in molding applications. More particularly, this invention relates to polyethylene terephthalate resins containing an inorganic reinforcing or filler material.

BACKGROUND

It is desirable to enhance the strength of articles molded from polyethylene terephthalate glass fibers, asbestos fibers or other fibrous mineral materials with a coupling agent, in the resin. Furthermore, it is sometimes sufficient to merely increase the modulus by use of a filler, such as beads or a mineral of low aspect ratio, in the resin. However, heretofore, it was necessary to use very high mold temperatures, on the order of 130° C., to obtain molded articles from such reinforced or filled resins which had a glossy surface and which were not rough in texture. If these high mold temperatures were not employed, the molded articles had a rough surface with poor gloss. It is believed that the crystallization rate of polyethylene terephthalate is too slow below about 130° C. to result in a molded article having good surface characteristics.

While good surface characteristics can be obtained at molding temperatures of 130° C. or more, the use of such temperatures is not practical in the molding field, for most molds are heated with water and attain temperatures of only about 85°–110° C.

A few molding devices employ heating means such as oil to reach temperatures higher than 85°–110° C. but these generally are inconvenient to use and still either do not generally reach such temperatures or reach them unevenly because of inadequate coring. Because of these heating problems, it has proven commercially unattractive to employ these high temperature molding devices with reinforced or filled polyethylene terephthalate resins.

SUMMARY OF THE INVENTION

It is desirable to provide a reinforced or filled polyethylene terephthalate resin that can be molded at mold temperatures below about 110° C. to produce a molded article having a smooth and glossy surface. The reinforced or filled polyethylene terephthalate resins of this invention achieve the foregoing by having incorporated therein (1) a sodium or potassium salt of a selected organic polymer containing pendant carboxyl groups and (2) a selected low molecular weight organic ester.

Specifically, the resins of this invention are compositions consisting essentially of:

A. polyethylene terephthalate having an intrinsic viscosity of at least about 0.4;

B. between about 10 and about 60 percent by weight reinforcing or filling material;

C. a sodium or potassium salt of an organic polymer which contains pendant carboxyl groups, said material present in an amount sufficient to provide a $\Delta H_H/\Delta H_c$ ratio of less than 0.25 to a mixture of components A, B and C;

D. a compound present in an amount sufficient to provide a Tpk at least 4° C. lower than the Tpk of a mixture of components A, B and C, said compound being an organic ester selected from the product of an aliphatic carboxylic acid of 1 to 20 carbon atoms containing 1–3 carboxyl groups, and an alcohol of the formula HO—R"O—$_y$R"' wherein R" is a hydrocarbon radical of 2–15 carbon atoms (preferably 2–8 carbon atoms), R"' is —H or a hydrocarbon radical of 2–20 carbon atoms (preferably 2–12 carbon atoms; and when R"' is H, y is a cardinal number between 2 and 15 (preferably between 2 and 8) and when R"' is a hydrocarbon radical, y is a cardinal number between 1 and 15 (preferably between 2 and 8).

DESCRIPTION OF THE INVENTION

The polyethylene terephthalate employed herein is one which has an inherent viscosity of at least 0.4. The polyethylene terephthalate preferably has an upper limit on inherent viscosity of about 1.2. Inherent viscosity is measured in a 3:1 by volume ratio of methylene chloride and trifluoroacetic acid at 30° C. The polyethylene terephthalate can contain minor amounts of other comonomers such as diethylene glycol or glutaric acid.

The reinforcing or filler material employed herein include glass fibers, glass beads, aluminum silicate, asbestos, mica and the like, or combinations thereof, as for example a mixture of mica and glass fibers.

Materials present in an amount sufficient to cause the compositions of the invention to have a $\Delta H_H/\Delta H_c$ ratio of less than 0.25 (component C defined above) include the sodium or potassium salts of carboxyl containing organic polymers, such as copolymers of olefins and acrylic or methacrylic acids, or copolymers of aromatic olefins and maleic anhydride. Preferably these materials include the sodium or potassium salt of ethylene/methacrylic acid copolymers (including both wholly or partially neutralized), and the sodium salt of styrene/maleic anhydride copolymers (including both wholly or partially neutralized salts e.g., at least about 30% neutralized). In the copolymers listed above the olefin or aromatic olefin moiety ordinarily comprises 50–98 percent by weight of the copolymer, and preferably 80–98 percent. An especially preferred material is the sodium salt of ethylene/methacrylic acid copolymer. The copolymers may be prepared by conventional high pressure polymerization technology.

Preferred organic esters of component D recited above are those in which the aliphatic carboxylic acids are hydrocarbon acids containing 1–3 carboxyl groups, preferably 1 or 2, and are of 4–10 carbon atoms and the alcohols are aliphatic. In other words, the R groups in the alcohols are alkyl or alkylene depending upon the particular R group. Preferably also when the carboxylic acids contain two or more carboxyl groups, the carboxyl groups are all reacted to form ester (COO) linkages, that is, there will be no free carboxyl groups present in the ester. Preferably, all the hydroxyl groups of the alcohols will also be reacted to form ester (COO) linkages, that is, there will be no free hydroxyl groups present in the ester.

Specific compounds within these definitions are listed following (The number in parenthesis after each compound is the number of degrees centigrade that 1 percent by weight of the compound present (based on polyethylene terephthalate) in the reinforced or filled polyethylene terephthalate lowers the Tpk): butyl carbitol adipate (2.9), triethylene glycol caprate-caprylate (2.7).

Components (C) and (D) in the compositions of this invention aid in obtaining molded articles of high surface gloss at molding temperatures below 110° C. by increasing the rate of crystallization of polyethylene terephthalate. Component (C) is believed to primarily aid in increasing the rate of crystallization while component (D) is believed to primarily improve the mobility of the polyethylene terephthalate in its supercooled state by reducing the viscosity of the supercooled mixture. Both are necessary to obtain the high gloss found in the articles molded from the composition.

The amount of component (C) present in the compositions of this invention is an amount which will result in a $\Delta H_H/\Delta H_c$ ratio of the composition less than 0.25. To find the $\Delta H_H/\Delta H_c$ ratio, polyethylene terephthalate is molded at 70° C. into 1/16" thick bars. The bars are heated and at between 95° C. and 120° C. an exotherm (termed $\Delta H_H$) is recorded on a differential scanning calorimeter (DSC) cell attached to a Du Pont 900 Differential Thermal Analysis (DTA) device. The bar is heated to 290° (which is above its melting point) and the melted sample cooled at 10° C./minute. Another exotherm at between about 200°–220° C. (termed $\Delta H_c$) is the exotherm recorded on freezing of the sample. It has been found that the $\Delta H_H/\Delta H_c$ ratio is a convenient method of measuring the degree of crystallization.

The Tpk of the composition of this invention is the temperature at which heat evolves most rapidly during the heating cycle recited in the previous paragraph. As stated earlier the amount of component (D) present in the composition of this invention is an amount which lowers the Tpk of the composition by at least 4° C. over that of an identical composition that does not contain component (D).

The upper limits on the amounts of components C and D are not critical. However, physical properties may become adversely affected as amounts increase. In general, the upper amount employed for any one component will usually be about 12 percent by weight based on weight polyethylene terephthalate, while the lower limit will be about 1 percent. For the preferred component (C) salts of ethylene/methacrylic acid copolymer the upper limit on the amount present will be about 12 percent by weight based on weight of polyethylene terephthalate while the lower limit will be about 0.5 percent, but preferably an amount within the range of 2–7 percent will be used.

In addition to the components discussed hereinabove, the compositions of this invention may contain additives commonly employed with polyester resins, such as colorants, mold release agents, antiixidants, ultraviolet light stabilizers, flame retardants and the like. Additives which improve physical properties, such as tensile strength and elongation can also be employed; such additives include epoxy compounds (e.g., an epoxy compound formed from bisphenol-A and epichlorohydrin present in amounts of from 0.1–1.5 percent by weight based on weight of composition.

The compositions of this invention are prepared by blending the components together by any convenient means. Neither temperature nor pressure are critical. For example, the polyethylene terephthalate can be mixed dry in any suitable blender or tumbler with components B, C and D and the mixture melt-extruded. The extrudate can be chopped and mixed with reinforcing agent and then this mixture melt extruded. More conveniently, all the components can be mixed dry in any suitable blender or tumbler and the mixture then melt extruded.

The following Examples describe the best mode of carrying out the invention. The $\Delta H_H/\Delta H_c$ ratio and the Tpk were determined as described above. The gloss of molded sample was measured with a Gardner Multi Angle Gloss (Model GG-9095) set at a selected degree angle set forth in the Examples.

EXAMPLE 1

Dry polyethylene terephthalate (PET) having an inherent viscosity of about 0.6 was mixed manually with 25% (based on total weight) of OCF 277B glass fiber, 5.7% (based on weight of PET) ethylene/methacrylic acid copolymer (85/15 by weight) which had been 60 percent neutralized with sodium (which is component C herein) and with 5.7% (based on weight of PET) triethylene glycol caprate-caprylate (which is component D herein), 0.6% (based on total weight) of the product of bisphenol A and epichlorohydrin, and 0.3% (based on total weight) of a phenolic antioxidant. Component C provided a $\Delta H_H/\Delta H_c$ of 0.16 and Component D provided a Tpk of 15.4° C. lower than the Tpk of a mixture the other ingredients.

The resulting mixture was then extruded through a two-stage two inch single screw extruder at a melt temperature of 285° C. and at a vacuum of 28 inches. The extruded strand was cut and the resulting resin pellets dried at 110° C. in a vacuum oven for about 16 hours. The resin pellets were then molded into tumblers that were 9.2 cm high, 7.5 cm in diameter at the top, 5.5 cm in diameter at the bottom and which had a wall thickness of 0.19 cm. Melt temperature in the molding machine was 295° C.; while the surface temperature of the mold was 85° C. at a cycle time of 10/20.

Gloss was measured at an angle of 60° by the Gardner Multi Angle Gloss Meter (Model GG-9095) several times for each sample. Gloss was measured around the circumference of the tumbler, at one-third the way down from the top. The highest reading was 64 and the lowest reading was 50.

In a comparison experiment, the identical ingredients were employed except that no triethylene glycol caprate-caprylate was used. The highest gloss reading obtained was 20 and the lowest was 15. Also the molding cycle had to be increased to 10/30 seconds injection over hold to get parts off the mold. Thus, it is seen that component D is necessary to obtain substantially higher gloss values.

EXAMPLE 2

PET as described in Example 1 was mixed with 30% glass fiber (based on total weight), 6.00% (based on weight of PET) of the ethylene/methacrylic acid copolymer (85/15 by weight) which had been 60% neutralized with sodium, and with 3.00% (based on weight of PET) of the bis(2-ethylhexanoate) of polyethylene glycol of mol wt 400 (which provided a Tpk 13° C. lower than that of a mixture of the other components).

The mixture was tested as described in Example 1. Highest gloss reading was 66 and the lowest reading was 59.

EXAMPLE 3

PET as described in Example 1 was mixed with 25% glass fiber (based on total weight), 6.00% (based on weight of PET) of the ethylene/methacrylic acid copolymer (85/15 by weight) which had been 60% neutralized with sodium, and with 3.00% (based on weight of PET) of the 2-ethylhexanoate of methoxy polyethylene glycol of mol wt 550 (which provided a Tpk about 10° C. lower than that of a mixture of the other components).

The mixture was tested as described in Example 1. Highest gloss reading was 55 and the lowest reading was 43.

I claim:

1. A composition having a smooth, glossy surface in molded form when molded at mold temperatures of between 85°-110° C., which composition consists essentially of:
   A. polyethylene terephthalate having an intrinsic viscosity of at least about 0.4;
   B. between about 10 and about 60 percent by weight reinforcing or filling material;
   C. material present in an amount sufficient to provide $\Delta H_H/\Delta H_c$ ratio of less than 0.25 to a mixture of components A, B and C, said material consisting essentially of at least one sodium or potassium salt of a carboxyl containing organic polymer;
   D. organic ester present in an amount sufficient to provide a Tpk at least 4° C. lower than the Tpk of a mixture of components A, B and C, selected from the product of an aliphatic carboxylic acid of 1 to 20 carbon atoms containing 1 to 3 carboxyl groups, and an alcohol of the formula HO(R"O)$_y$R''' where R" is —H or an aliphatic hydrocarbon radical of 2-20 carbon atoms, and when R''' is —H, y is a cardinal number between 2 and 15, and when R''' is an aliphatic hydrocarbon radical, y is a cardinal number between 1 and 15.

2. The composition of claim 1 wherein the salt of a carboxyl containing organic polymer of Component C is the sodium or potassium salt of a copolymer of an olefin and acrylic or methacrylic acid.

3. The composition of claim 1 wherein the salt of a carboxyl containing organic polymer of Component C is the sodium salt of a copolymer of ethylene and methacrylic acid in which at least 30% of the carboxyl groups are neutralized with sodium.

4. A composition having a smooth, glossy surface in molded form when molded at mold temperatures of between 85°-110° C., which composition consists essentially of:
   A. polyethylene terephthalate having an intrinsic viscosity of at least about 0.4;
   B. between about 10 and about 60 percent by weight reinforcing or filling material;
   C. material present in an amount sufficient to provide a $\Delta H_H/\Delta H_c$ ratio of less than 0.25 to a mixture of components A, B and C, said material consisting essentially of at least one sodium or potassium salt of a copolymer of an olefin and acrylic or methacrylic acid;
   D. organic ester present in an amount sufficient to provide a Tpk at least 4° C. lower than the Tpk of a mixture of components A, B and C, selected from the product of an aliphatic carboxylic acid of 4 to 10 carbon atoms having 1 or 2 carboxyl groups, and an alcohol of the formula HO(R"O)$_y$R''' wherein R" is an aliphatic hydrocarbon radical of 2-15 carbon atoms, R''' is —H or an aliphatic hydrocarbon radical of 2-20 carbon atoms, and when R''' is —H, y is a cardinal number between 2 and 15, and when R''' is an aliphatic hydrocarbon radical, y is a cardinal number between 1 and 15.

5. The composition of claims 1, 2 or 4 wherein Component B is glass fiber.

6. The composition of claims 1, 2 or 4 wherein Component B is glass fiber and said composition also contains 0.1 to 1.5 percent by weight of an epoxy compound.

7. The composition of claims 1, 2 or 4 wherein Component B is mica.

8. The composition of claims 1, 2 or 4 wherein Component B is a mixture of glass fiber and mica.

9. The composition of claim 1 in melt-extruded form.

10. A process for manufacturing a molded article having a smooth, glossy surface which comprises shaping a composition defined in claims 1, 2, 3 or 4 in a mold at a surface mold temperature of below 110° C.

* * * * *